US012791102B2

(12) United States Patent
Van Beek

(10) Patent No.: US 12,791,102 B2
(45) Date of Patent: Nov. 10, 2026

(54) VALVE WITH VALVE INSERT COMPRISING TWO CYLINDERS

(71) Applicant: Danfoss A/S, Nordborg (DK)

(72) Inventor: Johan Van Beek, Almind (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 19/100,173

(22) PCT Filed: Mar. 15, 2023

(86) PCT No.: PCT/EP2023/056613
§ 371 (c)(1),
(2) Date: Jan. 31, 2025

(87) PCT Pub. No.: WO2024/027957
PCT Pub. Date: Feb. 8, 2024

(65) Prior Publication Data

US 2026/0043481 A1 Feb. 12, 2026

(30) Foreign Application Priority Data

Aug. 1, 2022 (DK) ............................ PA202200729

(51) Int. Cl.
*F16K 1/42* (2006.01)
*F16K 1/46* (2006.01)
(Continued)

(52) U.S. Cl.
CPC .............. *F16K 1/422* (2013.01); *F16K 1/465* (2013.01); *F16K 1/10* (2013.01); *F16K 3/243* (2013.01);
(Continued)

(58) Field of Classification Search
CPC . F16K 1/422; F16K 1/465; F16K 1/10; F16K 3/243; F16K 3/246; F16K 27/02;
(Continued)

(56) References Cited

U.S. PATENT DOCUMENTS 2,875,978 A * 3/1959 Kmiecik ................. F16K 1/422 251/83
3,082,786 A * 3/1963 Mclean ................... F16K 27/02 251/366

(Continued)

FOREIGN PATENT DOCUMENTS

CN 203797069 U 8/2014
CN 203926952 U 11/2014

(Continued)

OTHER PUBLICATIONS

International Search Report mailed Jul. 7, 2023, in connection with corresponding International Application No. PCT/EP2023/056613; 4 pages.

*Primary Examiner* — Minh Q Le
(74) *Attorney, Agent, or Firm* — McCormick, Paulding & Huber PLLC

(57) ABSTRACT

A valve 10 for regulating a flow between a first and a second port 16, 18. A valve housing 12 includes a valve chamber 14 connected to the first and second ports 16, 18. A valve insert 26 inserted within the valve chamber 14 comprises a first cylinder 28 connected to a second cylinder 32 and a piston 34 movably arranged within the second cylinder 32. The piston 35 acts against a valve seat gasket 30. The first and said second cylinders 28, 32 are arranged axially aligned and connected by a releasable connection 44. The valve seat gasket 30 is arranged in a valve seat gasket chamber 62 formed between the first and second cylinders 28, 32 and providing a ring opening 80 for engagement of the valve seat gasket 30 with the piston 34.

20 Claims, 6 Drawing Sheets

(51) Int. Cl.

| | |
|---|---|
| *F16K 1/10* | (2006.01) |
| *F16K 3/24* | (2006.01) |
| *F16K 27/02* | (2006.01) |
| *F16K 31/50* | (2006.01) |
| *F16K 39/02* | (2006.01) |

(52) U.S. Cl.
CPC .............. *F16K 3/246* (2013.01); *F16K 27/02* (2013.01); *F16K 31/508* (2013.01); *F16K 39/022* (2013.01); *F16K 2200/501* (2021.08)

(58) Field of Classification Search
CPC . F16K 31/508; F16K 39/022; F16K 2200/501
USPC ..... 251/318; 137/289, 315.27, 454.5, 505.18
See application file for complete search history.

(56) References Cited

U.S. PATENT DOCUMENTS

| | | | | | |
|---|---|---|---|---|---|
| 3,112,763 | A * | 12/1963 | Tennis | F16K 17/18 | 137/493.5 |
| 3,272,219 | A | 9/1966 | Frantz | | |
| 3,572,382 | A | 3/1971 | Luthe | | |
| 3,995,658 | A * | 12/1976 | Hager | F16K 15/063 | 137/543 |
| 4,217,927 | A * | 8/1980 | Morita | F16K 17/196 | 137/493.3 |
| 4,471,802 | A * | 9/1984 | Pryor | G05D 16/0666 | 137/505.42 |
| 4,653,527 | A * | 3/1987 | Kosarzecki | F16K 17/0433 | 137/529 |
| 4,823,832 | A * | 4/1989 | Rodstein | F16K 3/08 | 251/304 |
| 4,834,338 | A | 5/1989 | Davis | | |
| 5,546,980 | A * | 8/1996 | Kosarzecki | F16K 27/02 | 137/454.6 |
| 6,997,430 | B2 | 2/2006 | Denning et al. | | |
| 8,459,297 | B2 * | 6/2013 | Clifford | G05D 16/0666 | 137/454.6 |
| 2004/0075072 | A1 * | 4/2004 | Lanting | F16K 1/465 | 251/175 |
| 2011/0174398 | A1 * | 7/2011 | Clifford | G05D 16/0666 | 137/549 |
| 2021/0222785 | A1 | 7/2021 | Chen et al. | | |

FOREIGN PATENT DOCUMENTS

| | | | |
|---|---|---|---|
| CN | 113757399 | A | 12/2021 |
| FR | 2970055 | A1 | 7/2012 |
| WO | 2017079531 | A1 | 5/2017 |
| WO | 2019085141 | A1 | 5/2019 |

* cited by examiner

Fig. 5
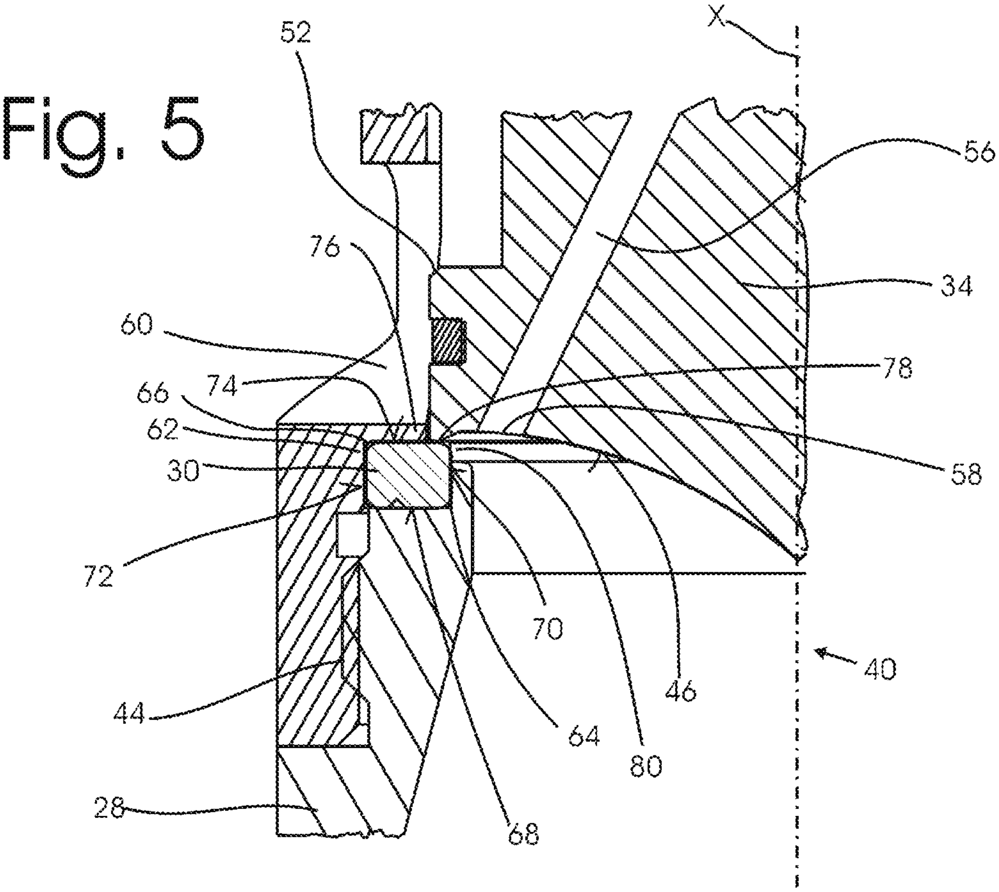
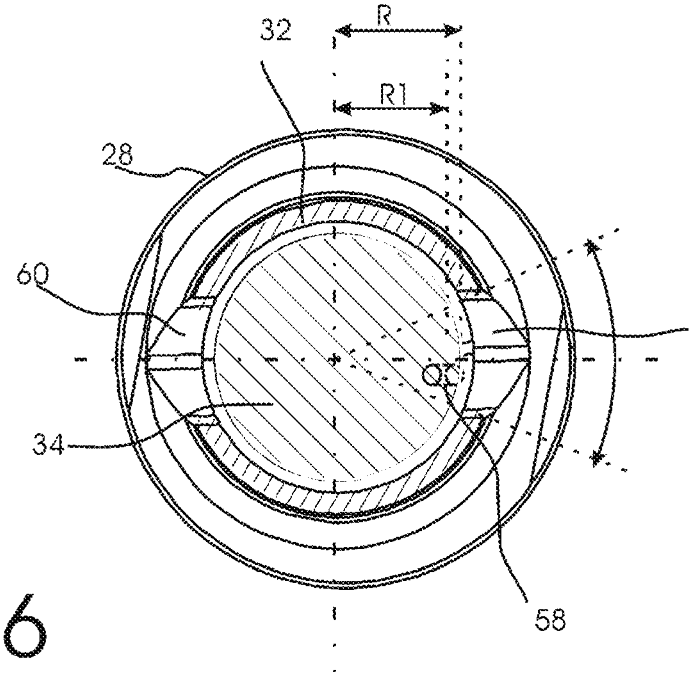
Fig. 6

VALVE WITH VALVE INSERT COMPRISING TWO CYLINDERS

CROSS-REFERENCE TO RELATED APPLICATIONS

This application is a National Stage application of International Patent Application No. PCT/EP2023/056613, filed on Mar. 15, 2023, which claims priority to Danish Patent Application No. PA202200729, filed on Aug. 1, 2022, each of which is hereby incorporated by reference in its entirety.

TECHNICAL FIELD

The invention relates to a valve, in particular for regulating a flow between a first and a second port.

BACKGROUND

Many types and constructions of valves are known for different fields of use. In particular in the field of industrial refrigeration, regulating valves for high working pressure of up to and above 50 bar are used.

The applicant offers a family of pressure and temperature regulating valves for industrial refrigeration, in particular motor operated valves of the ICM type comprising a steel valve body, a top cover and a function module. Different size and connection type valve bodies are available, and each body may be fitted with multiple top covers and different function models to give different capacities. PTFE valve seats provide excellent valve tightness. In combination with an actuator, an assembly of compact size is formed. The driving force from the actuator is transferred via a magnetic coupling through a stainless steel top housing. Rotational movement of the magnetic coupling is transferred to a spindle which in turn provides vertical movement of a piston and the valve seat to open and close the valve. Valve inlet pressure acting on an underside of the PTFE valve seat passes through a hollow piston assembly to the top of the piston and balances the pressure acting on the piston.

FR 2 970 055 A1 discloses a valve with an annular abutment seal contained between a cage and a seat carrier.

US 2021/222785 A1 describes a flow control device includes a valve body defining an in-let, an outlet, and a flow path. A valve seat assembly includes a fitting coupled to the valve body, a seat ring coupled to the fitting and defining a valve seat. A control element is movable relative to the valve body between a closed position, in which the control element engages the valve seat, and an open position, in which the control element is spaced away from the valve seat.

U.S. Pat. No. 4,834,338 A discloses a high pressure fluid valve. A valve plug moves relative to a cage against a valve seat with a deformable seal arranged in a cavity between a metal seal retainer and a seal ring housing.

U.S. Pat. No. 3,572,382 A shows a single-ported double-seated valve mechanism including a valve plug adapted to engage a first valve seat for terminating fluid flow through a flow passage in a valve body means and second valve seat means cooperating with the valve plug to seal only when the valve plug is in the closed position against the first valve seat means.

U.S. Pat. No. 3,272,219 A discloses a two-way check valve with a body and a cartridge formed of two coaxial threadedly connected main or inner and outer parts, the inner part an open-ended sleeve and the outer part a cap over the sleeve. Between the limits imposed by the cap and plug, the central aperture in the sleeve provides a cylindrical valve chamber in which slides a reciprocable shuttle.

WO 2019/085141 A1 discloses a valve with a body, a cartridge mounted in the body, and a seat and a cage matching the cartridge. A seal ring is provided in an annular gap attached to the outer circumferential surface of the cartridge.

CN 113 757 399 discloses a sealing structure for a valve with a first valve seat and a cage sleeve. The first valve seat is fixed on a valve body; a second valve seat is sleeved on the first valve seat, the end face of the first valve seat, facing the second valve seat, is provided with a V-shaped annular groove with an opening facing the second valve seat. A valve element/core is movable in the cage sleeve.

Particularly at high pressures, the sealing at the actual valve seat is of particular importance. It may be considered an object to provide a valve with a simple construction allowing secure mounting of a valve seat gasket.

SUMMARY

The object is solved by a valve according to claim 1. Dependent claims refer to preferred embodiments.

The valve according to the invention is suited for regulating a flow of a fluid between a first and a second port. The fluid may e.g. be a liquid, gas or mixture thereof. The regulating function of the valve preferably includes a closed state in which the first and second ports are sealed from one another as well as variable degrees of valve opening states to regulate the amount of fluid to pass between the ports, depending on a pressure difference.

The valve comprises at least a valve housing with a valve chamber and a valve insert inserted in the valve chamber.

The valve housing may be shaped differently, e.g. depending on the angular arrangement of the first and second port relative to each other and to the valve chamber; while the ports may be arranged at an angle to each other, it is preferred for the ports to be arranged in a straight line with the valve chamber interposed.

The valve insert comprises at least two cylinders, here referred to as first and second cylinder, connected to each other and arranged axially aligned, e.g. along a common central longitudinal axis, preferably arranged on top of each other, particularly preferred with a top portion of the first cylinder connected to an end portion of the second cylinder. The cylinders preferably have at least substantially hollow cylindrical shape, particularly preferred with a circular outer and inner cross-section. The inner and/or outer diameter of the cylinder elements vary gradually along the axial length thereof, forming cones (e.g. with inclined and/or curved shape in axial longitudinal section), and preferably different diameter ring shapes (with steps in axial longitudinal section). The term "least substantially hollow cylindrical shape" may be understood to indicate that the cylinder elements may have additional elements such as radial protrusions and/or radial openings, e.g. forming one or more radial window.

The valve insert further comprises a movable piston, preferably axially movable. The first and/or second cylinder may form or provide a valve seat including a valve seat gasket. The piston is arranged to move within the second cylinder, acting against the valve seat gasket to open or close the valve.

According to the invention, the first and second cylinders are connected by a releasable connection, which is a screw connection formed between an outer thread and an inner thread. The inner thread may e.g. be arranged on the first cylinder and the outer thread on the second cylinder, or vice versa. A releasable connection of the first and second cylinders, as opposed to the cylinders being formed as a common unitary body or being permanently connected e.g. by welding or gluing, has the advantage of allowing to easily position and if necessary replace the valve seat gasket.

The valve seat is provided with a valve seat gasket, arranged in a valve seat gasket chamber. The valve seat gasket chamber is formed between the first and second cylinder and is provided with at least one ring opening provided and positioned to allow engagement of the piston with the valve seat gasket arranged within the valve seat gasket chamber.

The valve seat gasket chamber therefore, viewed in axial longitudinal section, surrounds the valve seat gasket only partially, leaving open the at least one ring opening. It is preferred for inner surfaces of the valve seat gasket chamber, formed between the first and second cylinders by parts thereof, to surround and thereby position and/or fix the valve seat gasket from at least two opposing sides, preferably axially or radially distant from one another. It is further preferred for the inner surfaces to surround the valve seat gasket from at least three sides, and most preferably from four sides, particularly preferred from two pairs of opposing sides, such as radially and axially, therefore fixing the valve seat gasket exactly in position.

Preferably, the first and second cylinders are made from hard, durable material, preferably metal, particularly preferably steel, whereas the valve seat gasket may be fully or partially comprised of a material softer than the material of the first and second cylinders, in particular a flexible material, such e.g. an elastomer, PTFE or other gasket material. The valve seat gasket chamber which partially encloses and surrounds the valve seat gasket thus serves for exact positioning, mechanical support and also protection against mechanical influences of the fluid passing the opened valve, while the ring opening allows engagement of the piston with the valve seat gasket for sealing of the valve in the closed position. Therefore, the ring opening is preferably provided connecting the valve seat gasket chamber to an interior space of the first and/or second cylinder.

The releasable, in particular screwed connection serves to provide a well-defined, tight and mechanically stable way of fixing the first and second cylinders to each other.

According to a preferred embodiment, the first and/or second cylinder may comprise a step forming two inner surfaces, or side walls of the valve seat gasket chamber. A step is understood to mean an abrupt change in inner or outer diameter of the respective cylinder, such that in axial longitudinal section two surfaces appear at an angle, preferably at right angles to each other.

In one preferred embodiment, a top portion of the first cylinder may be received within an end portion of the second cylinder, i.e. the outer diameter of the top portion of the first cylinder is less than an inner diameter of the end portion of the second cylinder. The "top portion" of the first cylinder and "end portion" of the second cylinder refer to the axial ends of the respective cylinder oriented in the direction of the other cylinder. The first cylinder may comprise a step forming an outer ring space and the second cylinder may comprise a step forming an inner ring space. The valve seat gasket chamber may be formed between these steps, i.e. within both the inner and outer ring space. It should be understood that the construction may be reversed, i.e. the outer diameter of the end portion of the second cylinder may be alternatively smaller than the top portion of the first cylinder and be received therein.

According to a further preferred embodiment, the valve seat gasket chamber may be formed between two pairs of radial ring surfaces and axial ring surfaces. Specifically, the top portion of the first cylinder may comprise a first axial facing ring surface and a first radial ring surface facing outward. The end portion of the second cylinder may comprise a second axial facing ring surface and a second radial ring surface facing inward. The first and second axial facing ring surfaces are arranged opposite to each other at a distance and the first and second radial ring surfaces are also arranged opposite to each other at a distance, forming the valve seat gasket chamber in between.

To form the ring opening, one of the first and second axial facing ring surfaces may be provided shorter than the other and/or one of the first and second radial ring surfaces may be shorter than the other. It should be understood that this refers to the length as apparent in axial longitudinal section and that the length of the respective surface is measured in the direction of its extension, i.e. radially or axially. Preferably, the longer axial and radial surfaces together form one corner of the valve seat gasket chamber (in axial longitudinal section), such that the ring opening is formed at the opposite corner, between the ends of the shorter axial and shorter radial surface.

The piston, which is movably arranged against the valve seat gasket, is preferably of at least substantially cylindrical shape. Its front surface, oriented e.g. towards the first cylinder and/or towards the valve seat gasket, may be plane, but preferably has at least one elevated portion protruding in axial direction. In a preferred embodiment, the cylinder may comprise a central axially protruding portion forming a tip at the center, which—in axial longitudinal section—preferably has a smooth, arc-shaped connection to the rest of the front surface.

According to a further preferred embodiment, the piston may comprise an axially protruding outer ring. The outer ring may be arranged to engage the valve seal gasket to seal the valve in the closed position. The raised shape provides a defined seal position and tight seal.

Preferably, one of the ports, which here may be referred to as the first port, preferably the inlet, has a direct fluid connection to an inner space of the first and/or second cylinder, whereas the other, second port, preferably the outlet, is connected to the inside of the first and/or second cylinder only via the valve seat, so that the connection may be sealed when the piston engages the valve seat gasket. Further preferred, the first cylinder may be sealingly received in the valve housing such that an axial opening of the first cylinder is connected to the first port. The second port may be connected to the inside of the first and/or second cylinder by one or more radial openings provided on the first and/or second cylinder. Preferably, at least one radial opening, which may be referred to as a window, is provided in the second cylinder. There may be several windows distributed around the circumference of the second cylinder.

According to a preferred embodiment, the second cylinder may comprise an outer valve seat ring portion, provided axially between the radial opening(s) and the valve seat gasket. In a closed position of the valve, the front of the piston enters into the outer valve seat ring portion such that it is received therein, i.e. surrounded thereby, whereas in an open position of the valve the piston is arranged axially distant from the outer valve seat ring portion, thus providing an opening between the piston and the outer valve seat ring portion. The outer diameter of the piston and the inner diameter of the outer valve seat ring portion are preferably closely matched so that the two parts are in sliding contact or provided with minimum radial clearance, such that in a closed position of the valve the two parts leave no or only a minimum opening in between, thus effectively closing the valve seat, which is then sealed by the engagement of the piston and the valve seat gasket. Preferably, the outer valve seat ring portion provides a part of an enclosure of the valve seat gasket chamber. Further preferably, the ring opening of the valve seat gasket chamber is formed directly adjacent to the outer valve seat ring portion.

In a particularly preferred embodiment, an axially extending opening region of the second cylinder may be defined by the location and axial extension of the windows(s), i.e. radial opening(s). The axially extending opening region may be defined as the axial height of the windows. The valve chamber surrounding the first and/or second cylinders preferably comprises an enlarged ring space portion, i.e. a portion of increased inner diameter. According to the preferred embodiment, the enlarged ring space portion is at least partly axially located to overlap with the axially extending opening region. This provides more space for medium to flow through the window(s) to thereby allow a higher flow capacity. Further preferred the axially extending opening region of the second cylinder fully overlaps with the enlarged ring space portion surrounding the second cylinder, and particularly preferred the axially extending opening region of the second cylinder is centered in the enlarged ring space portion surrounding the second cylinder.

While the piston may be solid, it is preferred that an equalization pressure chamber is provided and a fluid conducting channel connected to it, traversing the piston. The equalization pressure chamber may be formed behind (and optionally partly within) the piston, such that at least a front portion of the piston, especially preferred the entire piston, is axially arranged between the valve seat and the equalization pressure chamber. The fluid conducting channel traversing the piston comprises an inlet formed in the front surface of the piston, i.e. in the surface oriented towards the first cylinder and/or valve seat gasket. Preferably, the inlet is arranged in an outer radial portion of the piston, preferably at a position at a distance (measured at the center of the inlet) from the center of the piston of more than 50% of the radius, further preferably at more than 75% of the radius, particularly preferred at more than 80%.

As stated above, the second cylinder preferably comprises one or more radial openings (windows). Preferably, the position of the inlet of the fluid conducting channel formed in the front surface of the piston is aligned with the position of one of the windows. A window may be arranged over an angular range of the circumference of the second cylinder, and the inlet may preferably be arranged within the angular range. The extent of the angular range may be determined in cross-section perpendicular to a longitudinal axis of the first/second cylinder, and the positioning of the inlet may be determined by its center.

In a preferred embodiment, the piston may comprise on its circumference at least a first and a second guiding ring surface. The diameter of the piston at the first and second guiding ring surfaces may be larger than the diameter of the piston between the first and second guiding ring surfaces. The first and second guiding ring surfaces may be arranged to contact the second cylinder, and may be axially spaced from one another, e.g. by more than 50% of the axial length of the piston. This arrangement provides good guidance for the piston to axially move within the second cylinder, guided by the guiding ring surfaces sliding against an inner surface of the second cylinder.

BRIEF DESCRIPTION OF THE DRAWINGS

In the following, embodiments of the invention will be described with reference to the drawings, in which

FIG. 5 shows an enlarged portion B of FIG. 3;

FIG. 6 shows a cross-sectional view taken along C . . . C in FIG. 4*a*,

DETAILED DESCRIPTION

Figure 1:
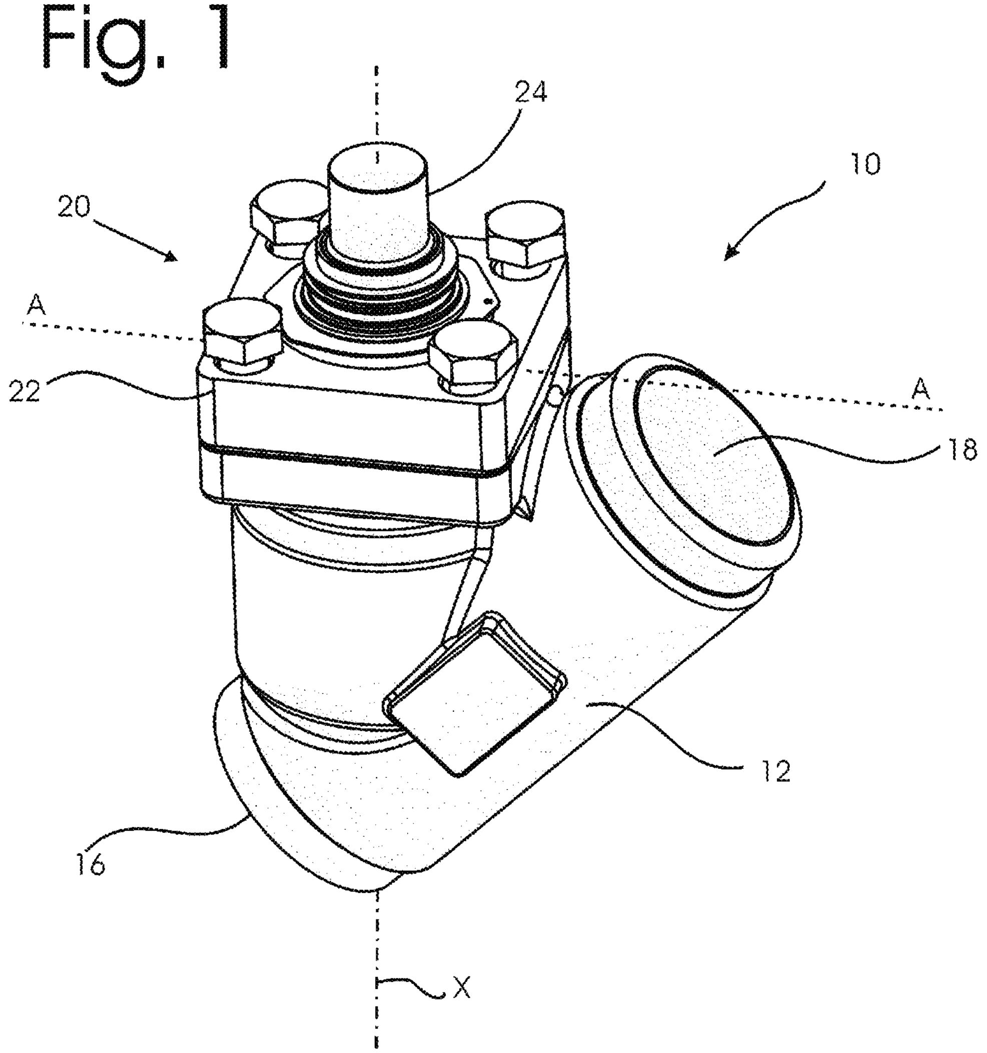
FIG. 1 shows a first embodiment of a valve in a perspective view.

FIG. 1 shows a first embodiment of a valve 10 with a valve housing 12 including a valve chamber 14, a first port (inlet) 16 and a second port (outlet) 18. In the embodiment shown, the valve 10 is a regulating valve for industrial refrigeration, which may be used for low and high pressure refrigerants with different phases of the refrigerant, including two phases of the refrigerant, such as e.g. a liquid refrigerant at the inlet and two phase refrigerant at the outlet.

The valve 10 comprises a top portion 20 with a top cover 22 and a cup 24 including a magnet to which an actuator may be magnetically coupled to control the valve opening, i.e. to regulate the flow of fluid between the first port 16 and second port 18.

Figure 2:
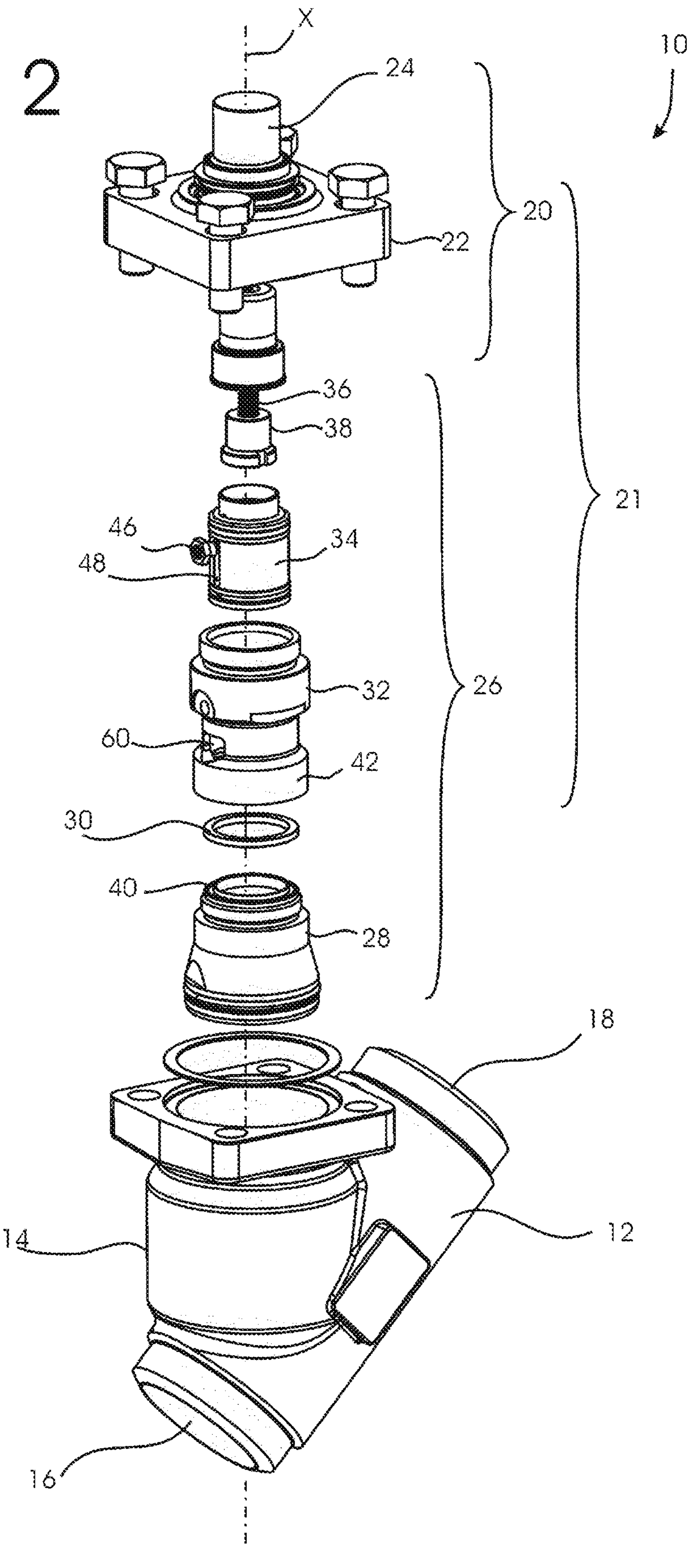
FIG. 2 shows the valve of FIG. 1 in an exploded view.

FIG. 2 shows an exploded view of the valve 10. As shown there, a valve insert 26 is inserted into the valve chamber 14. The valve insert 26 comprises a first cylinder 28, a valve seat gasket 30, a second cylinder 32, a piston 34, and a spindle 36 with a spindle nut 38.

The top portion 20 and the valve insert 26 together may be referred to as a function module 21. Different types of function modules 21 may be mounted to the valve housing 12 e.g. for different flow capacity.

The first and second cylinders 28, 32 of the valve insert 26 are hollow cylinders with varying inner and outer diameter, thus defining an interior space. The inner and outer diameter of the first cylinder decrease toward a top portion 40 thereof, thus forming a cone. The inner diameter of the second cylinder 32 is constant except for an enlarged end portion 42.

Figure 3:
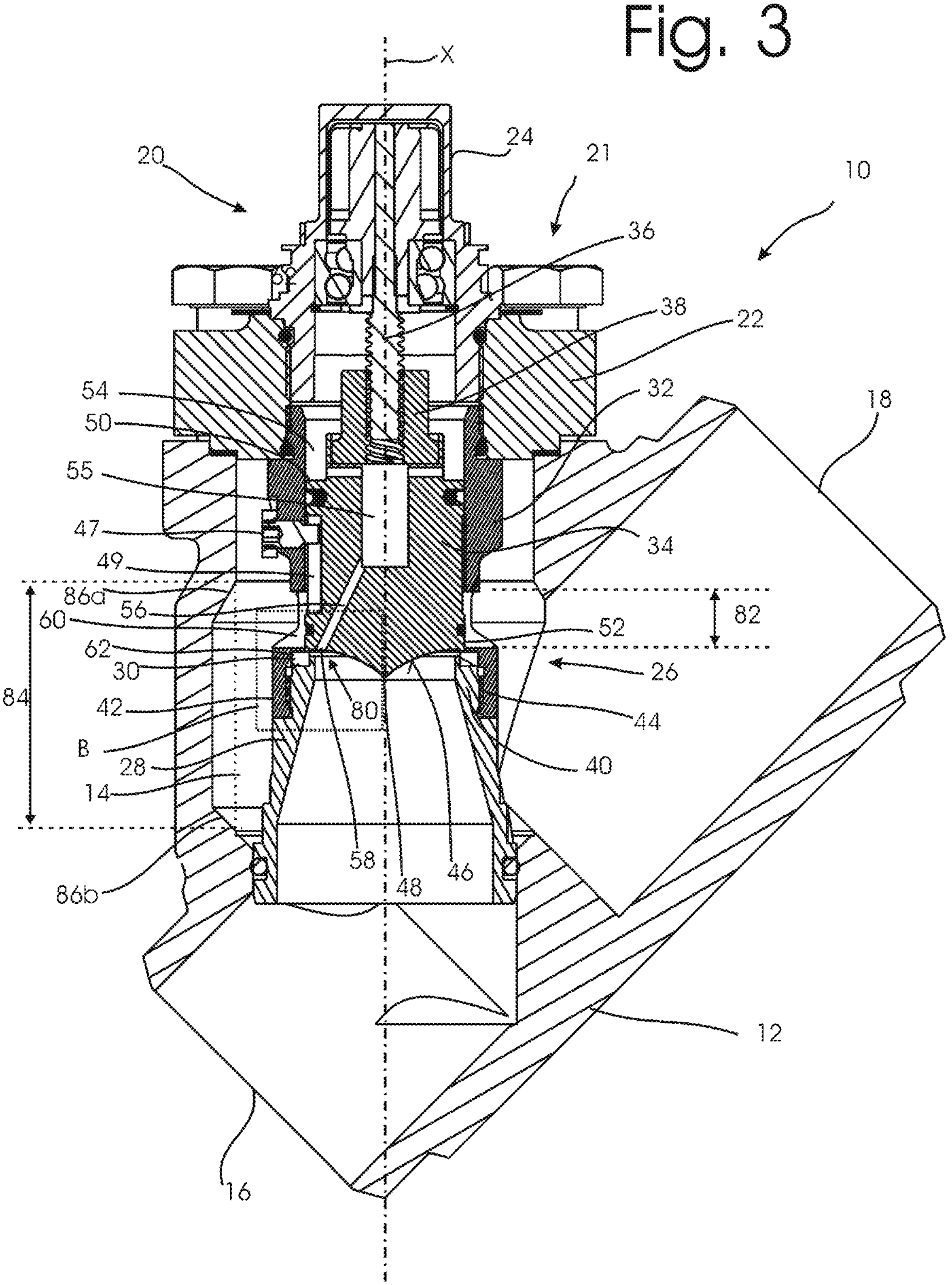
FIG. 3 shows an axial longitudinal section of the valve of FIGS. 1 and 2.

FIG. 3 shows the assembled valve 10 in axial longitudinal section in parallel to the longitudinal axis X.

As shown, the elements of the valve insert 26 are sealingly arranged in the valve chamber 14 such that a bottom opening of the first cylinder 28 is directly connected to the first port 16 and the radial outside of the first and second cylinders 28, 32 and surrounding valve chamber 14 is directly connected to the second port 18.

The first and second cylinders 28,32 are arranged coaxially on top of each other with a top portion 40 of the first cylinder 28 connected to an end portion 42 of the second cylinder 32 by a releasable connection, in the preferred example shown screwed connection 44 formed between an inner thread of the end portion 42 of the second cylinder 32 engaged with an outer thread formed around the top portion 40 of the first cylinder 28. The piston 34 is received in the interior of the second cylinder 32 and is axially movable relative thereto by rotation of the spindle 36 against the spindle nut 38.

The piston 34 has a radially protruding first guide ring 50 arranged towards the top thereof, and, axially spaced therefrom, a second guiding ring portion 52 also protruding radially. The outer surfaces of the guiding ring portions 50, 52 contact the interior surface of the second cylinder 32 and serve to guide the piston 34 therein. Axial movement of the piston 34 is further guided and rotational movement prevented by a guiding screw 47 fixed on the second cylinder 32 and received within an axial guiding groove 49 in the piston 34.

As visible in the longitudinal sectional view of FIG. 3, the piston 34 has a front surface 46 with a central, axially protruding tip 48 and an outer, raised ring portion 78 (visible in the enlarged view of FIG. 5). As will be explained, the outer ring 78 serves to seal the valve 10 by engaging the valve seat gasket 30.

An equalization pressure chamber 54 is provided behind the piston 34, which in the presently shown embodiment comprises a cavity 55 provided in the interior of the piston. The equalization pressure chamber 54 is connected to the front surface 46 by a channel 56 leading to an inlet 58 in the front surface 46 of the piston 34. The channel 56 and equalization pressure chamber 54 serve to counterbalance the piston 34 against high pressure from the inlet side (first port 16).

The second cylinder 32 comprises radial windows 60, connecting the interior space of the first cylinder 28 and second cylinder 32 to the surrounding valve chamber 14. In different embodiments, there may be a different number of windows 60, such as only one, two, or more. In the present embodiment, as shown in FIG. 6, two windows 60 are arranged opposed to each other, each covering an angular range a of about 45°.

The axial height of the windows 60 is shown in FIG. 3 as defining an axially extending opening region 82. It should be noted that the valve chamber 14 comprises different diameter sections, being more narrow in a top section surrounding a top portion of the second cylinder 32, and having a larger diameter in a ring space section 84 surrounding the valve seat. The inner diameter of the valve chamber 14 changes in two cone-shaped sections 86*a*, 86*b*. The enlarged ring space section 84 fully overlaps with the axially extending opening region 82 as shown in FIG. 3.

The first and second cylinder 28, 32 form in between the top portion 40 of the first cylinder 28 and the end portion 42 of the second cylinder 32 a valve seat gasket chamber 62. As visible in particular from the enlarged view of FIG. 5, the valve seat gasket chamber 62 is formed between a first outer step 64 provided in the top portion 40 of the first cylinder 28 and a second inner step 66 provided in the end portion 42 of the second cylinder 32.

The first, outer, step 64 provides a first axial ring surface 68 and a first radial ring surface 70, facing outward. The second, inner step 62 provided in the end portion 42 of the second cylinder 32 forms a second radial ring surface 72 facing inwards and a second axial ring surface 74. The valve seat gasket chamber 62 and valve seat gasket 30 contained therein is therefore bordered on four sides by a pair of axially facing ring surfaces 68, 74 and by a pair of radially facing ring surfaces 70, 72.

The first radial ring surface 70 is shorter than the second radial ring surface 72, and the second axial ring surface 74 is shorter than this first axial ring surface 68. The first axial ring surface 68 and second radial ring surface 72 are in contact and form a corner of the valve seat gasket chamber 62. At the opposite corner, a ring opening 80 is formed, exposing the valve seat gasket 30 to the interior space of a first and second cylinders 28, 32. As will become apparent, the ring opening 80 allows the piston 34 to engage the valve seat gasket 30 through the ring opening 80.

The second, inner step 66 provided in the end portion 62 of the second cylinder 32 forms a portion of the second cylinder 32 which is referred to here as an outer valve seat ring portion 76. The outer valve seat ring portion 76 borders the valve seat gasket chamber 62. Radially, it extends inward to provide sliding contact (or minimum clearance) to the circumference of the piston 34.

As visible in particular in FIG. 5, FIG. 6, the inlet 58 of the channel 56 traversing the piston 34 up to the cavity 55 which is a part of the equalization pressure chamber 54 is arranged radially outward within the front surface 46 of the piston 34. FIG. 6 shows a distance R1 between the central longitudinal axis X and a center of the inlet 58 to be close to the radius R of the piston 34.

Further, FIG. 6 shows the inlet 58 to be positioned within the angular range a of one of the windows 60.

In operation of the valve 10, an actuator (not shown) may be mounted to the magnet cup 24 to impart a rotation to spindle 36, thereby actuating valve nut 38 to adjust the axial position of the piston within the second cylinder 32, thereby closing the valve 10 or providing variable degrees of opening of the valve 10. The regulating function of the valve 10 is described with reference to FIG. 4*a*, 4*b:*

Figure 4A:
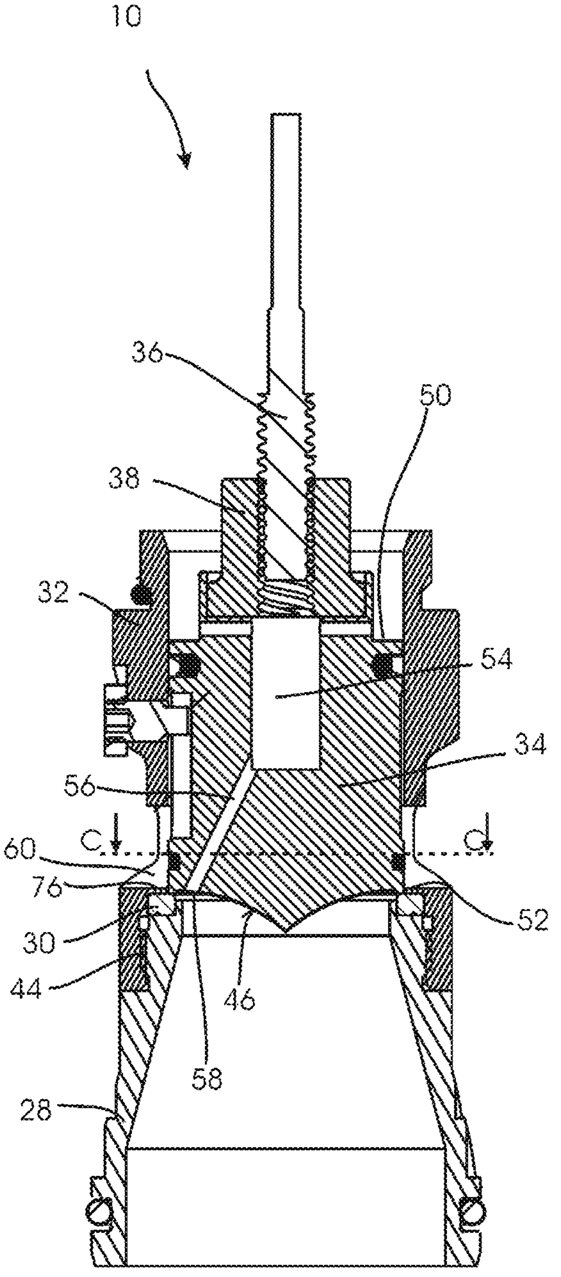
FIGS. 4*a* and 4*b* show axial longitudinal sections of an inner portion of the valve of FIGS. 1-3 in a closed position (4*a*) and in an open position (4*b*)
Figure 4B:
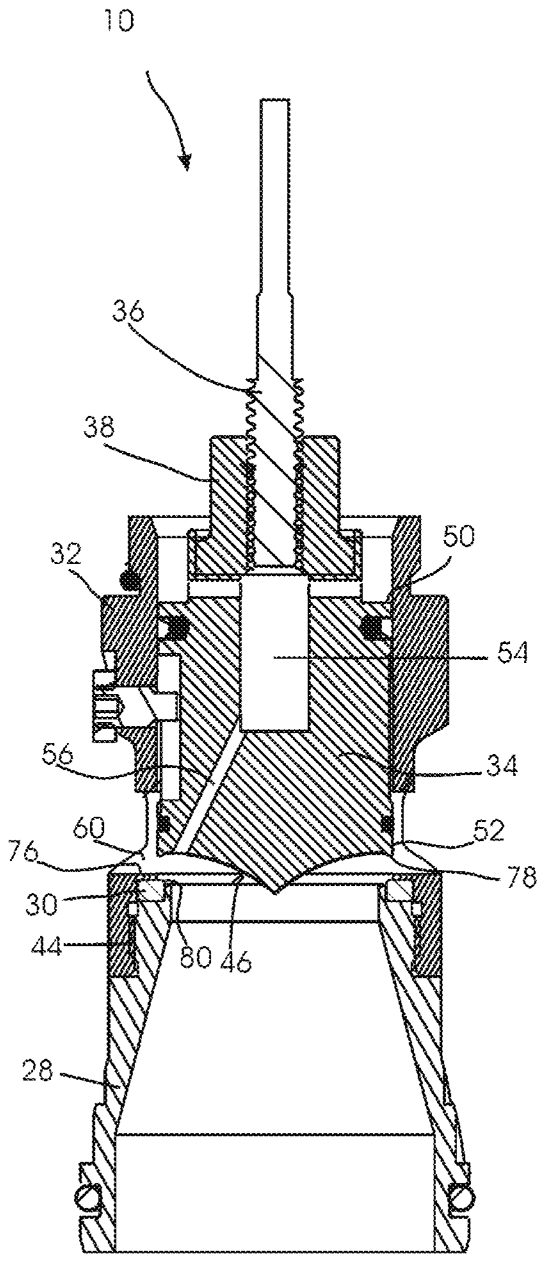

FIG. 4*a* shows the valve 10 in a closed position, whereas FIG. 4*b* shows an opening position of the valve 10.

In the opened position of the valve shown in FIG. 4*b*, the piston 34 is in an upper position retracted within the second cylinder 32, such that the front surface 46 of the piston 34, and in particular the raised outer ring 78 (see FIG. 5) thereof is arranged at a distance from the valve seat gasket 30 and from the outer valve seat ring portion 76. Therefore, a valve opening is provided allowing fluid from the inlet side (first port 16) to pass the valve seat and enter the valve chamber 14 through the windows 30 to flow to the outlet side (second port 18).

It should be noted that only a small portion of the valve seat gasket 30 is exposed to the flow of fluid through the valve opening, namely only the part of the valve seat gasket 30 exposed by the ring opening 80.

It should further be noted that due to the positioning of the inlet 58 of the channel 56, the pressure in the equalization chamber 54 will be equalized to the pressure at the valve seat, i.e. in between the valve seat gasket 30 and the circumference of the front surface 46 of the piston 34.

For closing the valve 10, the piston 34 is moved axially until the front surface 46 of the piston 34, and more particularly the raised outer ring 78 thereof, enters into and is thus received in the outer valve seat ring portion 76 and engages the flexible valve seat gasket 30, thereby closing and sealing the valve 10.

Figure 7:
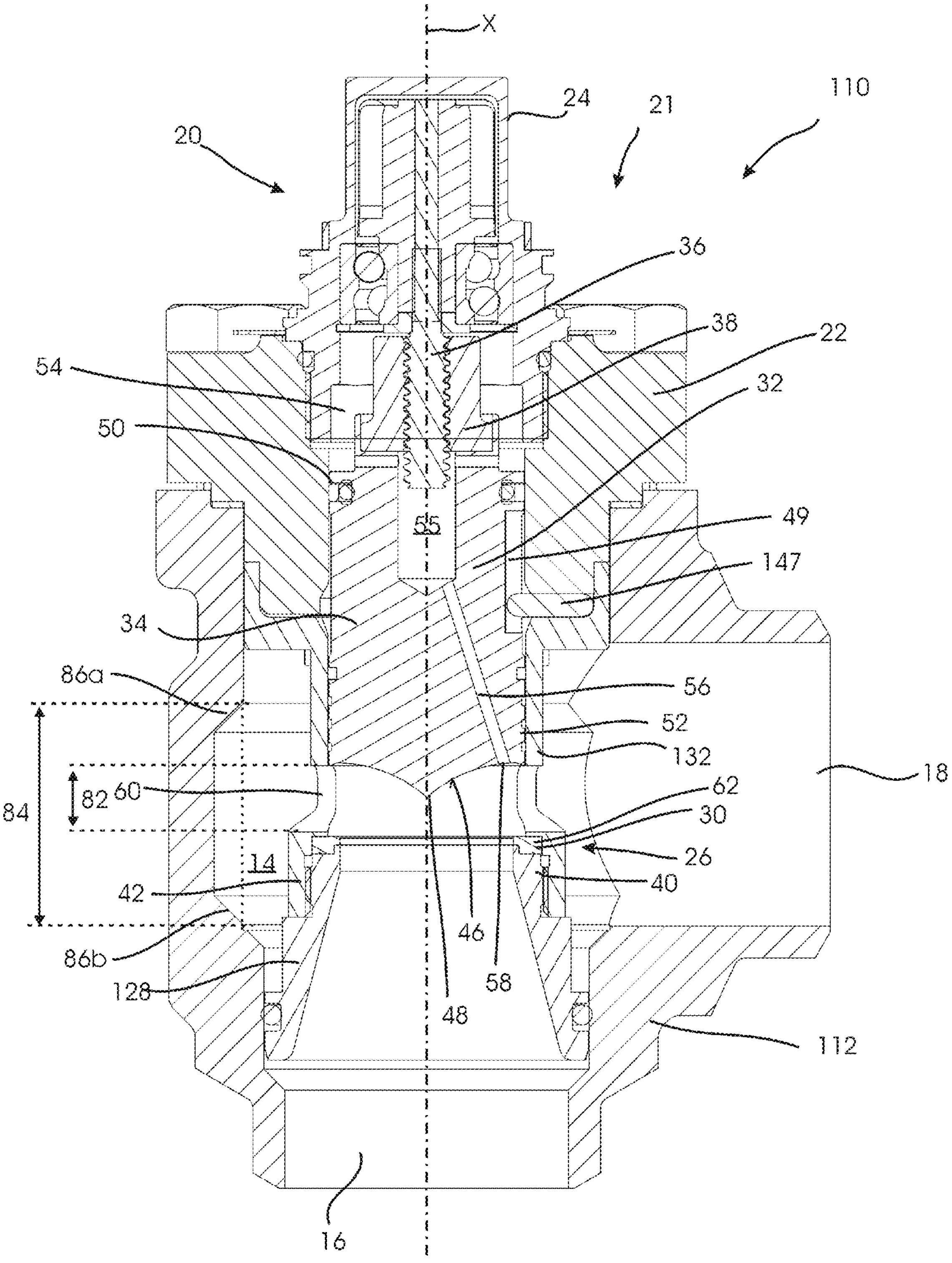
FIG. 7 shows a second, preferred embodiment of a valve in an axial longitudinal sectional view comparable to FIG. 3.

FIG. 7 shows a second, preferred embodiment of a valve 110, which in many respects corresponds to the valve 10 according to the first embodiment. Common parts in both embodiments are designated by the same reference numerals. In the following, only the differences between the embodiments will be discussed in detail.

As in the valve 10 according to the first embodiment, the valve 110 has a valve insert comprising co-axial first cylinder 128 and a second cylinder 132 releasably connected and fixing the valve seat gasket 30 in the valve seat gasket chamber 62 formed between the first and second cylinders 128, 132. Within the second cylinder 132 the piston 34 is movably arranged, actuated by spindle 36.

The valve 110 according to the second embodiment has, compared to the valve 10 according to the first embodiment, a differently shaped valve chamber 112 where inlet 16 and outlet 18 are arranged at right angles with one another. Like the valve chamber 12 of the first embodiment the valve chamber 112 has a ring space section 84 of enlarged diameter surrounding the valve seat. The axially extending opening region 82 defined by the axial height of the windows 60 is arranged centered within the ring space section 84, which further facilitates the flow.

In the valve 110 according to the second embodiment, axial movement of the piston 34 is guided and rotational movement prevented by a guiding pin 147 fixed by the top cover 22 and received within the axial guiding groove 49 in the piston 34.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve for regulating a flow between a first and a second port, said valve comprising:
a valve housing comprising a valve chamber connected to said first and second ports,
a valve insert inserted within said valve chamber, said valve insert comprising at least a first cylinder connected to a second cylinder, and a piston movably arranged within said second cylinder, said piston acting against a valve seat gasket,
wherein said first and said second cylinders are arranged axially aligned and connected by a releasable screw connection by an inner thread provided on the first cylinder engaged with an outer thread provided on the second cylinder, or by an outer thread provided on the first cylinder engaged with an inner thread provided on the second cylinder,
wherein an outer diameter of said first cylinder gradually decreases towards said second cylinder,
wherein said valve seat gasket is arranged in a valve seat gasket chamber, said valve seat gasket chamber being formed between said first and second cylinder, said valve seat gasket chamber providing a ring opening for engagement of said valve seat gasket with said piston.

2. The valve according to claim 1, wherein
a top portion of said first cylinder is received within an end portion of said second cylinder,
and wherein said first cylinder comprises a step forming an outer ring space,
and wherein said second cylinder comprises a step forming an inner ring space,
wherein said valve seat gasket chamber is formed between said steps.

3. The valve according to claim 2, wherein
a top portion of said first cylinder comprises a first axial facing ring surface and a first radial ring surface, said first radial ring surface facing outward,
and said end portion of said second cylinder comprises a second axial facing ring surface and a second radial ring surface, said second radial ring surface facing inward,
wherein said first and second axial facing ring surfaces are arranged opposite each other at a distance and said first and second radial ring surfaces are arranged opposite each other at a distance to form said valve seat gasket chamber.

4. The valve according to claim 3, wherein
to form said ring opening, one of said first and second axial facing ring surfaces is shorter than the other, measured in radial direction in an axial longitudinal section, and/or one of said first and second radial ring surfaces is shorter than the other, measured in axial direction in an axial longitudinal section.

5. The valve according to claim 1, wherein
said piston comprises an axially protruding outer ring arranged to engage said valve seal gasket.

6. The valve according to claim 1, wherein
said first cylinder is sealingly received in said valve housing, said first cylinder comprising an interior space connected to said first port,
and said second cylinder comprises at least one radial opening connected to said second port.

7. The valve according to claim 1, wherein
said second cylinder comprises one or more radial openings,
and wherein said second cylinder comprises an outer valve seat ring portion, provided axially between at least one of said radial openings and said valve seat gasket,
wherein, in a closed position of said valve, a part of said piston is received within said outer valve seat ring portion,
and wherein, in an open position of said valve, said piston is arranged axially distant to said outer valve seat ring portion, thus providing an opening between said piston and said outer valve seat ring portion.

8. The valve according to claim 7, wherein
said outer valve seat ring portion is a part of an enclosure of the valve seat gasket chamber,
and wherein said ring opening of said valve seat gasket chamber is formed directly adjacent to said outer valve seat ring portion.

9. The valve according to claim 6, wherein
said radial opening of said second cylinder extends over an axially extending opening region,
and wherein said valve chamber comprises an enlarged ring space portion surrounding said first and/or second cylinder, said enlarged ring space portion being located to at least partially overlap with said axial opening region.

10. The valve according to claim 1, wherein
said piston comprises a front surface,
wherein a fluid conducting channel is arranged at least partially traversing said piston,
said fluid conducting channel connecting an equalization pressure chamber to an inlet formed in said front surface,
wherein said inlet is arranged in an outer radial portion of said front surface.

11. The valve according to claim 10 and wherein said first cylinder is sealingly received in said valve housing, said first cylinder comprising an interior space connected to said first port, and said second cylinder comprises at least one radial opening connected to said second port, wherein
an angular range (a) of said second cylinder is defined by the width of at least one of said radial openings, determined in cross-section perpendicular to a longitudinal axis of the cylinder,
and said inlet is arranged within said angular range (a).

12. The valve according to claim 1, wherein
said piston comprises on its circumference at least a first guiding ring surface contacting said second cylinder, and a second guiding ring portion contacting said second cylinder,
wherein said first and second guiding ring surfaces are axially spaced from one another,
and wherein a diameter of said piston at said first and second guiding ring surfaces is larger than between said first and second guiding ring surfaces.

13. The valve according to claim 1, wherein
said releasable screw connection comprises an outer thread pro-vided provided on the first cylinder engaged with an inner thread provided on the second cylinder.

14. The valve according to claim 1, wherein
an inner diameter of said first cylinder gradually decreases towards said second cylinder.

15. The valve according to claim 14, wherein
said first cylinder comprises a circular cross-section with a conical shape.

16. A valve for regulating a flow between a first and a second port, said valve comprising:
a valve housing comprising a valve chamber connected to said first and second ports,
a valve insert inserted within said valve chamber, said valve insert comprising at least a first cylinder connected to a second cylinder, and a piston movably arranged within said second cylinder, said piston acting against a valve seat gasket,
wherein said first and said second cylinders are arranged axially aligned and connected by a releasable screw connection by an inner thread provided on the first cylinder engaged with an outer thread provided on the second cylinder, or by an outer thread provided on the first cylinder engaged with an inner thread provided on the second cylinder,
wherein said first cylinder is formed as a cone with a circular cross-section and gradually varying inner and outer diameters, said inner and outer diameters gradually decreasing towards said second cylinder, and
wherein said valve seat gasket is arranged in a valve seat gasket chamber, said valve seat gasket chamber being formed between said first and second cylinder, said valve seat gasket chamber providing a ring opening for engagement of said valve seat gasket with said piston.

17. The valve according to claim 16, wherein
a top portion of said first cylinder is received within an end portion of said second cylinder,
and wherein said first cylinder comprises a step forming an outer ring space,
and wherein said second cylinder comprises a step forming an inner ring space,
wherein said valve seat gasket chamber is formed between said steps.

18. The valve according to claim 17, wherein
a top portion of said first cylinder comprises a first axial facing ring surface and a first radial ring surface, said first radial ring surface facing outward,
and said end portion of said second cylinder comprises a second axial facing ring surface and a second radial ring surface, said second radial ring surface facing inward,
wherein said first and second axial facing ring surfaces are arranged opposite each other at a distance and said first and second radial ring surfaces are arranged opposite each other at a distance to form said valve seat gasket chamber.

19. The valve according to claim 18, wherein
to form said ring opening, one of said first and second axial facing ring surfaces is shorter than the other, measured in radial direction in an axial longitudinal section, and/or one of said first and second radial ring surfaces is shorter than the other, measured in axial direction in an axial longitudinal section.

20. The valve according to claim 16, wherein
said piston comprises an axially protruding outer ring arranged to engage said valve seal gasket.

* * * * *